July 14, 1942.     B. G. CARLSON     2,289,343
UNIVERSAL PRESSURE GAUGE
Filed June 15, 1938
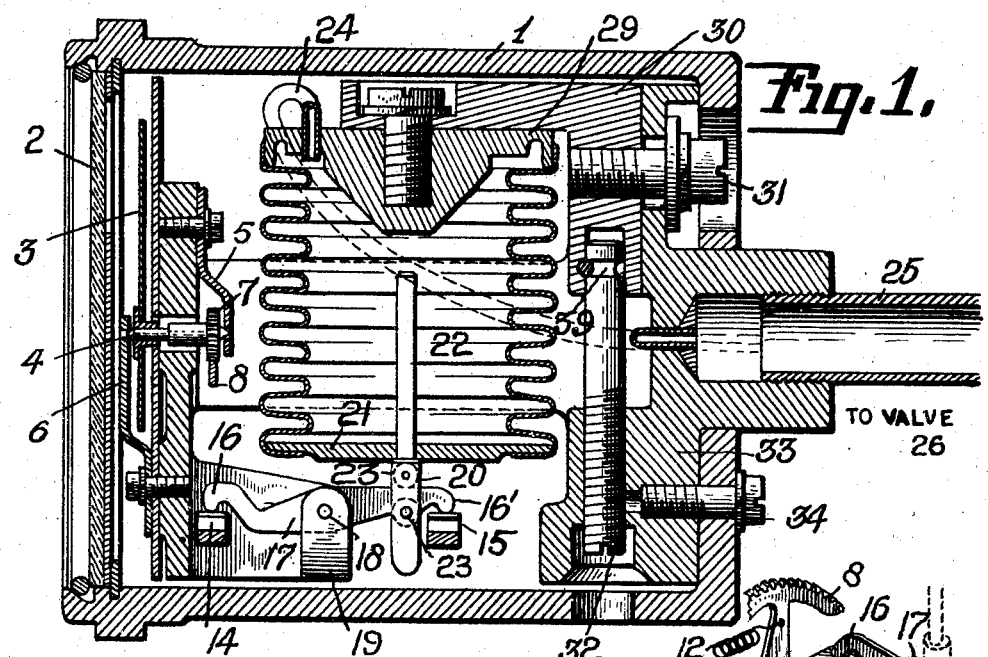
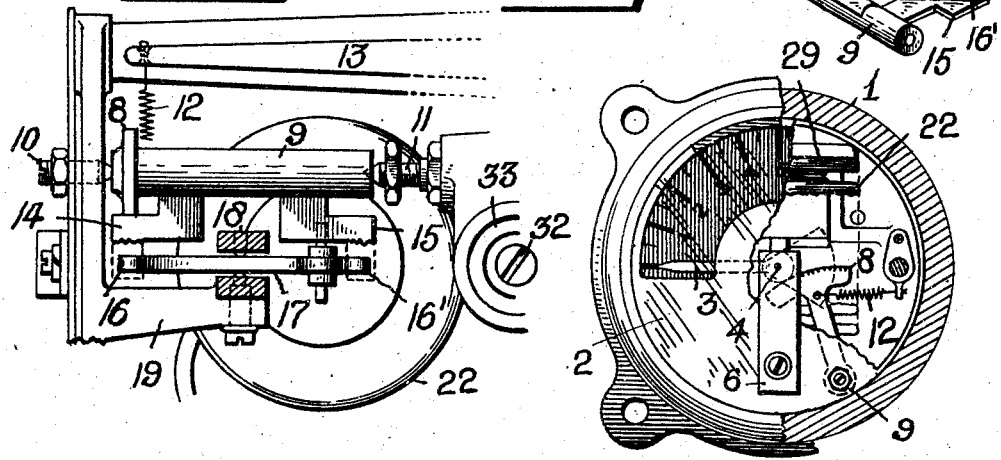
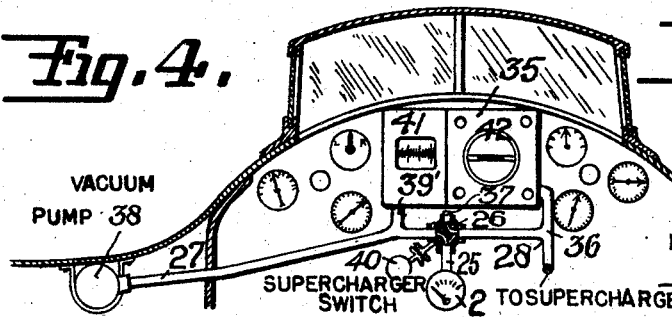
INVENTOR
*Bert G. Carlson*
BY
HIS ATTORNEY.

Patented July 14, 1942

2,289,343

UNITED STATES PATENT OFFICE 2,289,343

UNIVERSAL PRESSURE GAUGE

Bert G. Carlson, Freeport, N. Y., assignor to Sperry Gyroscope Company, Inc., Brooklyn, N. Y., a corporation of New York Application June 15, 1938, Serial No. 213,739

4 Claims. (Cl. 73—110)

This invention relates to pressure gauges adapted for use on airplanes to show the operating air pressure supplied for operating the air driven and air operated instruments. In aircraft, it is usual to operate the instruments by a vacuum pump, i. e., by pressure below that of the atmosphere, such instruments comprising several types of indicators such as the turn indicator, artificial horizon and directional gyroscope. Such negative pressure also serves to operate the airplane automatic pilot by differential air pick-off from the controlling instruments. At higher altitudes, however, the vacuum system loses efficiency on account of the drop in atmospheric pressure. It therefore becomes necessary to employ positive pressure pumps to drive the instruments at altitudes above, say, 15,000 to 20,000 feet. It also becomes desirable at such high altitudes to supercharge the passenger compartments on air liners for the comfort of the passengers. It is proposed, therefore, to drive the instruments at these higher altitudes from the compressed air in the supercharged cabin, thus avoiding the necessity for an extra pump.

In my invention I provide a pressure gauge which may be used either when the instruments are vacuum driven or pressure driven, and which will read the same in both cases, showing only the actual effective pressure at which the instruments are operating.

Referring to the drawing,

Fig. 1 is a longitudinal vertical section through my improved pressure gauge.

Fig. 2 is a face view of the same, partly in section, and drawn to a smaller scale than Fig. 1.

Fig. 3 is a bottom plan view of the interior of the instrument, the outer casing being removed.

Fig. 4 is a diagrammatic view showing the instrument panel of an aircraft with my gauge and throw-over valve mounted thereon.

Fig. 5 is a detail of one of the parts between the expansible bellows and indicator pointer.

My instrument is enclosed within the usual cylindrical casing 1, having a circular glass front window 2 through which the indicating pointer 3 is visible. The pointer is shown as mounted on a stub shaft 4 pivoted in brackets 5 and 6, on which shaft is mounted a pinion 7 meshing with a gear sector or arm 8 extending from a member or bracket 9 pivoted on pins 10 and 11. Member 9 is normally biased in one direction by a spring 12 extending to fixed arm 13. This member is also provided with a pair of laterally extending arms 14 and 15, on which rest the two opposite ends or feet 16 and 16' of a lever or rocker arm 17 pivoted at 18 in a bracket 19. One end of said lever extends through a U-shaped extension 20 extending downwardly from the bottom 21 of an expansible bellows or Sylphon 22, and to which the lever is pinned, anti-friction bearings 23 being provided between the member 20 and the lever to reduce friction.

Assuming that the bellows occupies the position shown in Fig. 1, when the pressure within and without the same is equal, it will be readily apparent that the movement of the bellows in either direction will rotate the member 9 in the same direction, since downward movement of the end 16 will move the arm 15 downwardly, while upward movement of the end 16 will result in downward movement of the other end 16' and therefore will move the arm 14, and therefore arm 15, also downwardly. Therefore the gauge will read the same, that is, show the correct operating pressure, whether the pressure within the bellows is greater than or less than the pressure outside of the bellows.

In order to adjust the pointer to the zero position when there is no differential pressure, I mount the supporting block 29 of the bellows on an adjustable bracket 30 normally clamped to the back of the instrument by set screws 31. To make an adjustment, the set screws are loosened and a threaded shaft 32 is turned by means of a screw driver. Said shaft is threaded in a fixed bracket 33 which is held in place by set screws 34, and its upper end rotatably but not slidably mounted in the bracket 30 at 39, so that said bracket may be readily adjusted up and down until the gauge is set properly, whereupon the screws 31 are tightened.

The interior of the bellows is shown as connected through a pipe 24 with a pipe 25 leading to a throw-over valve 26 (Fig. 4). When this valve is in the position shown in Fig. 4, the interior of the bellows is connected to the pipe 27 leading to the vacuum pump and to the exhaust pipe connection 39' on the gyro-pilot 35 (containing both a directional gyroscope 41 and an artificial horizon 42), so that the gauge will show the negative pressure supplied to the instruments by the pump. At the same time, the intake pipe connection 36 to the pilot is connected to the atmosphere through outlet 37. When, however, the valve is turned counter-clockwise 90° to its other position, the interior of the bellows will be connected to the pipe 28 leading to the supercharged cabin, or other pressure supply, and to the intake connection on the gyro-pilot. At the same time the exhaust pipe 39' is connected to the atmosphere through port 37, thus cutting out vacuum pump 38.

It will be understood that the instruments, being mounted on the panel, are not subject to the pressure within the passengers' compartment, but remain at the prevailing atmospheric pressure so that the exterior of the bellows is at all times exposed to atmospheric pressure. If, however, the gauge were placed in the supercharged cabin, it would still operate satisfactorily, but in such event the valve 26 would always remain in the position shown in Fig. 4, connecting the interior of the bellows to the vacuum pump which, it will be understood, is not run when the supercharger pressure is on; otherwise excessive pressure would be supplied to the instruments. Valve 26 may be directly connected to the switch knob 40 which turns the supercharger for the cabin (not shown) on and off, so that the valve 26 is thrown from the position shown in Fig. 4 to its other position when the supercharger for the cabin, or other pressure pump, is started.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In a pressure gauge, a normally centralized expansible and contractible bellows, means for connecting the interior thereof to a source of positive or negative pressure to be measured, a pressure indicator for showing the operating pressure, means including a mechanical linkage system connecting said indicator and bellows, for moving said indicator in the same direction in response to either expansion or contraction of said bellows from its normal position, whereby said indicator reads in the same direction whether the pressure being measured is above or below the prevailing atmospheric pressure, and means for adjusting the position of said bellows to bring the indicator to zero when the operating pressure is zero.

2. In a pressure gauge, a normally centralized expansible and contractible bellows, means for connecting the interior thereof to a source of positive or negative pressure to be measured, a pressure indicator showing the operating pressure, a rocker arm connected to said bellows to be rocked in one direction or the other as the bellows expands or contracts from its normal position, a member pivoted to one side of said arm on an axis at an angle to the axis of rotation of said arm and engaged by both ends of said arm when the bellows is in its normal position, whereby said member is rotated in the same direction regardless of the direction in which said arm is rocked when the bellows is moved from its normal position, said pressure indicator being rotated by said member.

3. In a pressure gauge, a normally centralized expansible and contractible bellows adapted to expand or contract from its normal position proportional to the pressure in its interior above or below that of the surrounding air, means for connecting the interior thereof to a source of positive or negative pressure to be measured, a pressure indicator for showing the operating pressure, means including a mechanical linkage system actuated by the expansion or contraction of said bellows, for exerting a force in the same direction in response to either expansion or contraction of the bellows, and means operating said indicator by said force whereby said indicator shows the operative pressure without regard to its positive or negative character.

4. In a pressure gauge, a normally centralized expansible and contractible bellows, means for connecting the interior thereof to a source of positive or negative pressure to be measured, a pressure indicator for showing the operating pressure, and means, including a mechanical linkage system connecting said indicator and bellows, for moving said indicator in the same direction in response to expansion or contraction of said bellows from its normal or neutral position, whereby said indicator reads in the same direction whether the pressure being measured is above or below the prevailing atmospheric pressure, said mechanical linkage system comprising a rocker arm having one end linked to said bellows, and a member having laterally extending arms pivoted at one side of said rocker arm with its pivotal axis extending in a direction at right angles to the direction of extension of the pivotal axis of said rocker arm and with the ends of the rocker arm bearing against the lateral arms of said member at a predetermined position, whereby rocking of said rocker arm in either direction from said predetermined position rotates said member in the same direction, said indicator being moved by said member.

BERT G. CARLSON.